United States Patent
Wei et al.

(10) Patent No.: US 10,914,481 B2
(45) Date of Patent: Feb. 9, 2021

(54) DUCT-TYPE AIR CONDITIONING SYSTEM, AND CONTROL METHOD AND DEVICE FOR INDOOR VENTILATOR THEREOF

(71) Applicants: GD MIDEA HEATING & VENTILATING EQUIPMENT CO., LTD., Foshan (CN); MIDEA GROUP CO., LTD., Foshan (CN)

(72) Inventors: Fudang Wei, Foshan (CN); Ming Song, Foshan (CN); Yiyang Mo, Foshan (CN); Geng Luo, Foshan (CN)

( * ) Notice: Subject to any disclaimer, the term of this patent is extended or adjusted under 35 U.S.C. 154(b) by 0 days.

(21) Appl. No.: 16/469,644

(22) PCT Filed: May 12, 2017

(86) PCT No.: PCT/CN2017/084218
§ 371 (c)(1),
(2) Date: Jun. 14, 2019

(87) PCT Pub. No.: WO2018/126581
PCT Pub. Date: Jul. 12, 2018

(65) Prior Publication Data
US 2020/0088428 A1    Mar. 19, 2020

(30) Foreign Application Priority Data

Jan. 5, 2017    (CN) .......................... 2017 1 0008093

(51) Int. Cl.
*F24F 11/30*    (2018.01)
*F24F 11/64*    (2018.01)
(Continued)

(52) U.S. Cl.
CPC .............. *F24F 11/30* (2018.01); *F24F 11/56* (2018.01); *F24F 11/64* (2018.01); *F24F 11/65* (2018.01);
(Continued)

(58) Field of Classification Search
CPC .. F24F 11/30; F24F 11/77; F24F 11/64; F24F 11/65; F24F 11/56; F24F 2110/10;
(Continued)

(56) References Cited

U.S. PATENT DOCUMENTS

| | | | | |
|---|---|---|---|---|
| 2008/0028780 A1* | 2/2008 | Song | ....................... | F24F 11/83 62/228.1 |
| 2013/0261808 A1* | 10/2013 | Besore | ..................... | F24F 11/62 700/278 |
| 2016/0069581 A1* | 3/2016 | Wiese | ..................... | F24F 11/30 236/44 C |

FOREIGN PATENT DOCUMENTS

| | | |
|---|---|---|
| CN | 1232946 A | 10/1999 |
| CN | 103940058 A | 7/2014 |

(Continued)

OTHER PUBLICATIONS

The first Office Action dated Dec. 5, 2018 in the corresponding CN application No. 201710008093.6.
(Continued)

*Primary Examiner* — Charles R Kasenge
(74) *Attorney, Agent, or Firm* — Kilpatrick Townsend & Stockton, LLP

(57) ABSTRACT

A duct-type air conditioning system, a control method and a device for an indoor ventilator thereof. The control method comprises the following steps: upon turning on the duct-type air conditioning system, acquiring an indoor temperature and a set temperature recorded the last time the duct-type air conditioning system was turned off, and acquiring a present set temperature (S1) according to the indoor temperature and the set temperature recorded the last time the system was turned off; detecting a real-time indoor temperature, according to the present indoor temperature and the present set temperature, calculating a temperature difference between the present indoor temperature and the set temperature, and
(Continued)

generating an air velocity adjustment instruction according to the temperature difference, controlling, according to the air velocity adjustment instruction, the indoor ventilator to adjust the air supply velocity (S4) of an indoor unit.

12 Claims, 2 Drawing Sheets

(51) Int. Cl.
    *F24F 11/65*     (2018.01)
    *F24F 11/56*     (2018.01)
    *F24F 11/77*     (2018.01)
    *G05B 19/042*     (2006.01)
    *F24F 110/10*     (2018.01)
    *F24F 110/12*     (2018.01)

(52) U.S. Cl.
    CPC ............ *F24F 11/77* (2018.01); *G05B 19/042* (2013.01); *F24F 2110/10* (2018.01); *F24F 2110/12* (2018.01); *G05B 2219/2614* (2013.01)

(58) Field of Classification Search
    CPC ........ F24F 2110/12; F24F 11/62; F24F 11/74; G05B 19/042; G05B 2219/2614
    See application file for complete search history.

(56) References Cited

FOREIGN PATENT DOCUMENTS

| | | |
|---|---|---|
| CN | 104296322 A | 1/2015 |
| CN | 104315657 A | 1/2015 |
| CN | 104374059 A | 2/2015 |
| CN | 106091259 A | 11/2016 |
| JP | S60211248 A | 10/1985 |
| JP | 2008045810 A | 2/2008 |

OTHER PUBLICATIONS

The second Office Action dated Jul. 16, 2019 in the corresponding CN application No. 201710008093.6.

* cited by examiner

DUCT-TYPE AIR CONDITIONING SYSTEM, AND CONTROL METHOD AND DEVICE FOR INDOOR VENTILATOR THEREOF

PRIORITY CLAIM AND RELATED APPLICATION

The present disclosure is a national phase application of International Application No. PCT/CN2017/084218, filed May 12, 2017, which claims the priority of Chinese Application No. 201710008093.6, filed in the Chinese Patent Office on Jan. 5, 2017, the entire contents of which are herein incorporated by reference.

FIELD

The present disclosure relates to the field of air conditioner technologies, and more particularly to a method for controlling an indoor fan of a duct-type air conditioning system, a device for controlling an indoor fan of a duct-type air conditioning system, and a duct-type air conditioning system having the device thereon.

BACKGROUND

With the increasing applications of air conditioners, people are increasingly demanding comfort on the air conditioners.

A common air conditioner may automatically adjust a wind speed of an indoor fan according to temperature conditions. However, for an air conditioner employing a standard wire controller, a user sets a temperature through the wire controller, and the wire controller detects an ambient temperature and outputs a startup signal or a shutdown signal to the indoor unit based on needs, and then the indoor unit starts up or shuts down based on the startup signal or the shutdown signal.

Since the wire controller cannot transmit the set temperature and the ambient temperature to the indoor unit, the indoor unit cannot obtain these parameters, and cannot automatically adjust an air volume according to these parameters, thereby causing that a comfort performance and an energy conservation performance of the air conditioner are poor, and a dehumidification performance of the air conditioner is also poor.

SUMMARY

One embodiment of the present disclosure is to provide a method for controlling an indoor fan of a duct-type air conditioning system. Under a case that the indoor unit cannot receive a set temperature and an ambient temperature, the indoor unit may obtain the set temperature by a certain operation rule, thereby controlling an air volume automatically, improving a dehumidification performance of the air conditioner, and increasing a comfort performance and an energy conservation performance of the air conditioner.

Another embodiment of the present disclosure is to provide a non-transitory computer readable storage medium.

Yet another embodiment of the present disclosure is to provide a device for controlling an indoor fan of a duct-type air conditioning system.

One embodiment of the present disclosure is to provide a duct-type air conditioning system.

Embodiments of the present disclosure provides a method for controlling an indoor fan of a duct-type air conditioning system, including acts of: when the system starts up, obtaining an indoor temperature value and a set temperature value recorded at a previous shutdown of the system, and obtaining a present set temperature value according to the indoor temperature value and the set temperature value recorded at the previous shutdown of the system; detecting a present indoor temperature value in real time; calculating a temperature difference between the present indoor temperature value and the present set temperature value, and generating an instruction for adjusting a wind speed according to the temperature difference; and controlling the indoor fan according to the instruction for adjusting the wind speed, to adjust an outlet air volume of the indoor unit.

With the method for controlling the indoor fan of the duct-type air conditioning system provided in the embodiments of the present disclosure, when the system starts up, the present set temperature value is obtained according to the indoor temperature value and the set temperature value recorded at the previous shutdown of the system, then the temperature difference between the present indoor temperature value and the present set temperature value is calculated, and the instruction for adjusting the wind speed is generated according to the temperature difference, and finally the indoor fan is controlled according to the instruction for adjusting the wind speed, to adjust the outlet air volume of the indoor unit. Therefore, under a case that the indoor unit cannot receive the set temperature and the ambient temperature, the indoor unit may obtain the set temperature by the certain operation rule, thereby controlling the air volume automatically, improving the dehumidification performance of the air conditioner, and increasing the comfort performance and the energy conservation performance of the air conditioner.

According to an embodiment of the present disclosure, the above method for controlling the indoor fan of the duct-type air conditioning system further includes: correcting the present set temperature value according to a relationship between the present indoor temperature value when the system starts up and the present set temperature value.

According to an embodiment of the present disclosure, correcting the present set temperature value according to the relationship between the present indoor temperature value when the system starts up and the present set temperature value includes: when the system operates in a refrigeration mode, setting the present set temperature value to be a difference between the present indoor temperature value when the system starts up and a second temperature threshold in response to the present set temperature value being greater than or equals to a difference between the present indoor temperature value when the system starts up and a first temperature threshold; and when the system operates in a heating mode, setting the present set temperature value to be a sum of the present indoor temperature value when the system starts up and the second temperature threshold in response to the present set temperature value being lower than or equals to a sum of the present indoor temperature value when the system starts up and the first temperature threshold.

According to an embodiment of the present disclosure, the method further includes: during the system operates, obtaining the temperature difference in real time, and correcting the present set temperature value according to a present temperature difference and a temperature difference before the system continuously operates for a preset x minutes.

According to an embodiment of the present disclosure, correcting the present set temperature value according to the present temperature difference and the temperature difference before the system continuously operates for the preset x minutes includes: when the system operates in a refrigeration mode, correcting the present set temperature value by reducing a third temperature threshold from the present set temperature value in response to the present temperature difference being greater than the temperature difference before the system continuously operates for the preset x minutes; and when the system operates in a heating mode, correcting the present set temperature value by adding the third temperature threshold to the present set temperature value in response to the present temperature difference being greater than the temperature difference before the system continuously operates for the preset x minutes.

According to an embodiment of the present disclosure, when the system starts up first, a preset original set temperature value is taken as the present set temperature value.

Embodiments of the present disclosure provides a non-transitory computer readable storage medium having computer programs stored thereon. When the computer programs are executed by a processor, the above method for controlling the indoor fan of the duct-type air conditioning system is implemented.

With the non-transitory computer readable storage medium provided in the embodiments of the present disclosure, the above method for controlling the indoor fan of the duct-type air conditioning system is executed. Therefore, under a case that the indoor unit cannot receive the set temperature and the ambient temperature, the indoor unit may obtain the set temperature by the certain operation rule, thereby controlling the air volume automatically, improving the dehumidification performance of the air conditioner, and increasing the comfort performance and the energy conservation performance of the air conditioner.

Embodiments of the present disclosure provides a device for controlling an indoor fan of a duct-type air conditioning system, including an obtaining device, a temperature detecting device and a control device. The obtaining device is configured to, when the system starts up, obtain an indoor temperature value and a set temperature value recorded at a previous shutdown of the system, and obtain a present set temperature value according to the indoor temperature value and the set temperature value recorded at the previous shutdown of the system. The temperature detecting device is configured to, detect a present indoor temperature value in real time. The control device is configured to, calculate a temperature difference between the present indoor temperature value and the present set temperature value, generate an instruction for adjusting a wind speed according to the temperature difference, and control the indoor fan according to the instruction for adjusting the wind speed, to adjust an outlet air volume of the indoor unit.

With the device for controlling the indoor fan of the duct-type air conditioning system provided in the embodiments of the present disclosure, when the system starts up, the obtaining device may obtain the indoor temperature value and the set temperature value recorded at the previous shutdown of the system, and obtain the present set temperature value according to the indoor temperature value and the set temperature value recorded at the previous shutdown of the system, then the control device may calculate the temperature difference between the present indoor temperature value and the present set temperature value, generate the instruction for adjusting the wind speed according to the temperature difference, and finally control the indoor fan according to the instruction for adjusting the wind speed, to adjust the outlet air volume of the indoor unit. Therefore, under a case that the indoor unit cannot receive the set temperature and the ambient temperature, the indoor unit may obtain the set temperature by the certain operation rule, thereby controlling the air volume automatically, improving the dehumidification performance of the air conditioner, and increasing the comfort performance and the energy conservation performance of the air conditioner.

According to an embodiment of the present disclosure, the above device for controlling the indoor fan of the duct-type air conditioning system further includes: a first correction device. The first correction device is configured to correct the present set temperature value according to a relationship between the present indoor temperature value when the system starts up and the present set temperature value.

According to an embodiment of the present disclosure, the first correction device is configured to correct the present set temperature value according to the relationship between the present indoor temperature value when the system starts up and the present set temperature value, in which, when the system operates in a refrigeration mode, the present set temperature value is set to be a difference between the present indoor temperature value when the system starts up and a second temperature threshold in response to the present set temperature value being greater than or equals to a difference between the present indoor temperature value when the system starts up and a first temperature threshold; and when the system operates in a heating mode, the present set temperature value is set to be a sum of the present indoor temperature value when the system starts up and the second temperature threshold in response to the present set temperature value being lower than or equals to a sum of the present indoor temperature value when the system starts up and the first temperature threshold.

According to an embodiment of the present disclosure, the obtaining device is further configured, during the system operates, obtain the temperature difference in real time, and the device further includes a second correction device. The second correction device is configured to correct the present set temperature value according to a present temperature difference and a temperature difference before the system continuously operates for a preset x minutes.

According to an embodiment of the present disclosure, the second correction device is configured to correct the present set temperature value according to the present temperature difference and the temperature difference before the system continuously operates for the preset x minutes, in which, when the system operates in a refrigeration mode, the second correction device is configured to correct the present set temperature value by reducing a third temperature threshold from the present set temperature value in response to the present temperature difference being greater than the temperature difference before the system continuously operates for the preset x minutes; and when the system operates in a heating mode, the second correction device is configured to correct the present set temperature value by adding the third temperature threshold to the present set temperature value in response to the present temperature difference being greater than the temperature difference before the system continuously operates for the preset x minutes.

According to an embodiment of the present disclosure, the obtaining device is configured to, when the system starts up first, take a preset original set temperature value as the present set temperature value.

In addition, embodiments of the present disclosure further provide a duct-type air conditioning system, including the above device for controlling the indoor fan of the duct-type air conditioning system.

With the duct-type air conditioning system provided in the embodiments of the present disclosure, by the above device, under a case that the indoor unit cannot receive the set temperature and the ambient temperature, the indoor unit may obtain the set temperature by the certain operation rule, thereby controlling the air volume automatically, improving the dehumidification performance of the air conditioner, and increasing the comfort performance and the energy conservation performance of the air conditioner.

DETAILED DESCRIPTION

Reference will now be made in detail to the embodiments of the present disclosure, examples of which are illustrated in the accompanying drawings, in which the same or similar numbers represent the same or similar elements or the elements with the same or similar function. The embodiments described in the following accompany drawings are exemplary, only for purpose of description of the present disclosure, but not constructed to limit the present disclosure.

A method for controlling an indoor fan of a duct-type air conditioning system, a device for controlling an indoor fan of a duct-type air conditioning system, and a duct-type air conditioning system having the device thereon, according to the embodiments of the present disclosure, will be described below with reference to the accompanying drawings.

Figure 1:
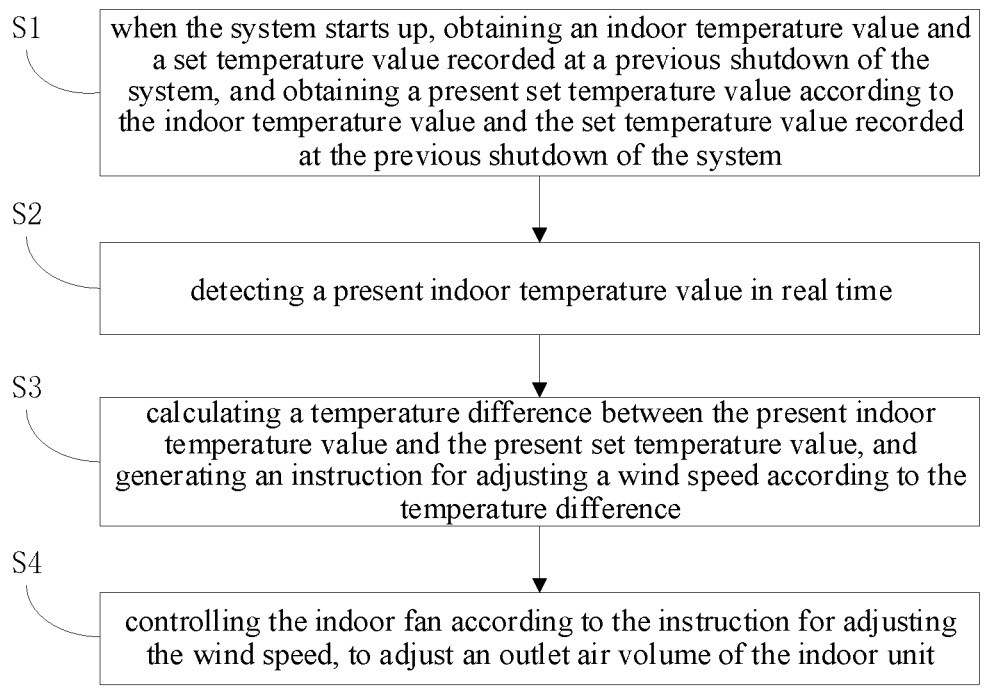
FIG. 1 illustrates a flow chart of a method for controlling an indoor fan of a duct-type air conditioning system according to an embodiment of the present disclosure.

FIG. 1 illustrate is a flow chart of a method for controlling an indoor fan of a duct-type air conditioning system according to an embodiment of the present disclosure. As illustrated in FIG. 1, the method may include acts in following blocks.

At block S1, when the system starts up, an indoor temperature value and a set temperature value recorded at a previous shutdown of the system are obtained, and a present set temperature value is obtained according to the indoor temperature value and the set temperature value recorded at the previous shutdown of the system.

According to an embodiment of the present disclosure, when the system starts up first, a preset original set temperature is taken as the present set temperature.

At block S2, a present indoor temperature value is detected in real time.

In detail, the indoor temperature value may be detected in real time by a temperature sensor disposed at a return air duct of the indoor unit.

At block S3, a temperature difference between the present indoor temperature value and the present set temperature value is calculated, and an instruction for adjusting a wind speed is generated according to the temperature difference.

At block S4, the indoor fan is controlled according to the instruction for adjusting the wind speed, to adjust an outlet air volume of the indoor unit.

Figure 3:
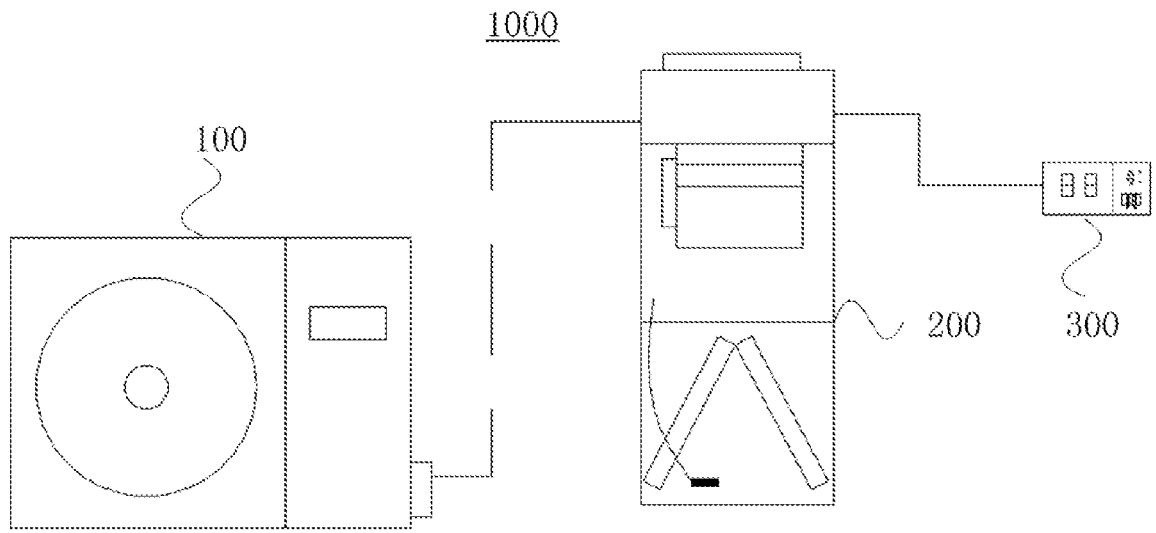
FIG. 3 illustrates a schematic diagram of a duct-type air conditioning system according to an embodiment of the present disclosure.

In detail, as illustrated in FIG. 3, the system may include an outdoor unit, the indoor unit, and a controller. The controller controls the indoor unit to start up or shut down according to its set temperature value (which may be set by a user) and an indoor temperature value sensed by itself.

When the controller controls the indoor unit to start up first, the indoor unit may generate the instruction for adjusting the wind speed according to a temperature difference between the present indoor temperature value obtained by the temperature sensor at the return air duct and the preset original set temperature value, and adjust the outlet air volume of the indoor unit according to the instruction for adjusting the wind speed. When the indoor temperature value sensed by the controller reaches the controller's set temperature value, the controller sends a shutdown instruction to the indoor unit. The indoor unit shuts down and records the indoor temperature value and the set temperature value at the shutdown after receiving the shutdown instruction.

When the controller determines that the indoor unit needs to be controlled to start up again according to the controller's set temperature value and the indoor temperature value sensed by the controller, the controller sends a startup instruction to the indoor unit. At this time, the indoor unit obtains the present set temperature value according to the indoor temperature value and the set temperature value recorded at the previous shutdown. For example, the present set temperature value equals to the indoor temperature value recorded at the previous shutdown; or the present set temperature value=the indoor temperature value recorded at the previous shutdown *D1+the set temperature value recorded at the previous shutdown *D2, in which, D1 and D2 are scale factors. Then, the indoor unit generates the instruction for adjusting the wind speed according to the temperature difference between the present indoor temperature value detected in real time and the present set temperature value obtained, and adjusts the outlet air volume of the indoor unit according to the instruction for adjusting the wind speed. Therefore, under a case that the indoor unit cannot receive the set temperature and the ambient temperature, the indoor unit may obtain the set temperature by the certain operation rule, thereby controlling the air volume automatically, improving the dehumidification performance of the air conditioner, and increasing the comfort performance and the energy conservation performance of the air conditioner.

According to an embodiment of the present disclosure, the above method further includes the following act. The present set temperature value is corrected according to a relationship between the present indoor temperature value when the system starts up and the present set temperature value.

In detail, the set temperature value of the controller may be adjusted. Therefore, if the controller controls the indoor unit to start up, when the indoor unit, based on the present set temperature value obtained according to the indoor temperature value and the set temperature value recorded at the previous shutdown, and the indoor temperature value detected by the indoor unit at the startup, determines that the indoor unit is not in accordance with the basic startup demand, the present set temperature value of the indoor unit needs to be corrected.

For example, the set temperature value recorded at the previous shutdown of the system is 27° C., and the indoor temperature value recorded at the previous shutdown of the system is 25° C. Correspondingly, the present set temperature value obtained may be 26° C. (when D1=D2=50%), and the indoor temperature value detected by the indoor unit through the temperature sensor at the return air duct is 26° C. when the controller controls the indoor unit to start up. In this case, the indoor unit does not work according to a control logic of the indoor unit. Therefore, the present set temperature value of the indoor unit may be corrected (e.g. corrected to be 24° C.) according to a size relationship between the indoor temperature value when the indoor unit starts up and the present set temperature value, to ensure that the indoor unit may work normally.

Further, according to an embodiment of the present disclosure, correcting the present set temperature value according to the relationship between the present indoor temperature value when the system starts up and the present set temperature value includes: when the system operates in a refrigeration mode, setting the present set temperature value to be a difference between the present indoor temperature value when the system starts up and a second temperature threshold in response to the present set temperature value being greater than or equals to a difference between the present indoor temperature value when the system starts up and a first temperature threshold; and when the system operates in a heating mode, setting the present set temperature value to be a sum of the present indoor temperature value when the system starts up and the second temperature threshold in response to the present set temperature value being lower than or equals to a sum of the present indoor temperature value when the system starts up and the first temperature threshold.

The first temperature threshold and the second temperature threshold may be calibrated according to an actual condition. For example, the first temperature threshold and the second temperature threshold may be a value among 0° C. to 5° C.

In detail, the controller may control the indoor unit to start up or shut down according to its set temperature value and the indoor temperature value sensed by itself, and simultaneously control the indoor unit to start up in the heating mode or in the refrigeration mode according to an operation mode (provided by the user, or the operation mode is determined automatically).

When the controller controls the indoor unit to start up in the refrigeration mode according to the need, the indoor unit firstly obtains the present set temperature value Ts according to the indoor temperature value T1 recorded at the previous shutdown in the refrigeration mode (or, T1 and the set temperature value recorded at the previous shutdown in the refrigeration mode), then the present set temperature value Ts is corrected according to the present set temperature value Ts and the indoor temperature value T1' detected by the indoor unit when the indoor unit starts up in the refrigeration mode again. If Ts≤T1'−a (a is the first temperature threshold), the present set temperature value is corrected to be Ts'=T1'−b (b is the second temperature threshold). Then the instruction for adjusting the wind speed is generated according to a temperature difference between the present indoor temperature value obtained in real time and the present set temperature value Ts', and the outlet air volume of the indoor unit is adjusted according to the instruction for adjusting the wind speed.

When the controller controls the indoor unit to start up in the heating mode according to the need, the indoor unit firstly obtains the present set temperature value Ts according to the indoor temperature value T1 recorded at the previous shutdown in the heating mode (or, T1 and the set temperature value recorded at the previous shutdown in the heating mode), then the indoor unit corrects the present set temperature value Ts according to the present set temperature value Ts and the indoor temperature value T1' detected by the indoor unit when the indoor unit starts up in the heating mode again. If Ts≤T1'+a, the present set temperature value is corrected to be Ts'=T1'+b. Then the instruction for adjusting the wind speed is generated according to a temperature difference between the present indoor temperature value obtained in real time and the present set temperature value Ts', and the outlet air volume of the indoor unit is adjusted according to the instruction for adjusting the wind speed. In this way, by correcting the set temperature value, it is ensured that the indoor unit may operate normally after receiving the startup instruction from the controller.

According to an embodiment of the present disclosure, during the system operates, the temperature difference is obtained in real time, and the present set temperature value is corrected according to a present temperature difference and a temperature difference before the system continuously operates for a preset x minutes. The preset x minutes may be calibrated according to the actual condition.

Further, according to an embodiment of the present disclosure, correcting the present set temperature value according to the present temperature difference and the temperature difference before the system continuously operates for the preset x minutes includes: when the system operates in a refrigeration mode, correcting the present set temperature value by reducing a third temperature threshold from the present set temperature value in response to the present temperature difference being greater than the temperature difference before the system continuously operates for the preset x minutes; and when the system operates in a heating mode, correcting the present set temperature value by adding the third temperature threshold to the present set temperature value in response to the present temperature difference being greater than the temperature difference before the system continuously operates for the preset x minutes. The third temperature threshold may be calibrated according to the actual condition. For example, the third temperature threshold may be the value among 0° C. to 5° C.

In detail, during the system operates, the indoor unit may perform updating on energy and needs according to the change of the detected indoor temperature value, that is, continuously updating is performed on the set temperature value, and the outlet air volume is adjusted according to the updated set temperature value.

For example, during the indoor unit operates in the refrigeration mode, the set temperature value is corrected at regular intervals. When the set temperature value is corrected, a temperature difference between the set temperature value and the indoor temperature value, before the system continuously operates for the preset x minutes prior to the present time point, may be obtained. For example, if the present time point is t1, and a time point before the system continuously operates for the preset x minutes is t2, the temperature difference $\Delta Tt1$ between the set temperature value and the indoor temperature value at the present time point t1 is obtained, and the temperature difference $\Delta Tt2$ between the set temperature value and the indoor temperature value at the time point t2 is obtained. Then, it is determined whether ΔTt1 is greater than ΔTt2. If yes, the set temperature value Ts is updated, and the updated set temperature value is Ts"=Ts−c (c is the third temperature threshold), and then the outlet air volume is adjusted according to the updated set temperature value Ts"; and if no, the present temperature value is not adjusted.

As another example, during the indoor unit operates in the heating mode, the set temperature value is corrected at regular intervals. When the set temperature value is corrected, a temperature difference between the set temperature value and the indoor temperature value, before the system continuously operates for the preset x minutes prior to the present time point, may be obtained. For example, if the present time point is t1, and a time point before the system continuously operates for the preset x minutes is t2, the temperature difference ΔTt1 between the set temperature value and the indoor temperature value at the present time point t1 is obtained, and the temperature difference ΔTt2 between the set temperature value and the indoor temperature value at the time point t2 is obtained. Then, it is determined whether ΔTt1 is greater than ΔTt2. If yes, the set temperature value Ts is updated, and the updated set temperature is Ts"=Ts+c, and then the outlet air volume is adjusted according to the updated set temperature value Ts". In this way, the set temperature value is updated in real time according to the indoor temperature value, to obtain a preferable set temperature value, such that the system reaches to a preferable operation state, thus ensuring the comfort performance and the energy conservation performance of the system.

It should be noted that, when the set temperature value is corrected, the set temperature value has certain limitation, to prevent that a false correction occurs and causes the system not to operate reliably.

Figure 2:
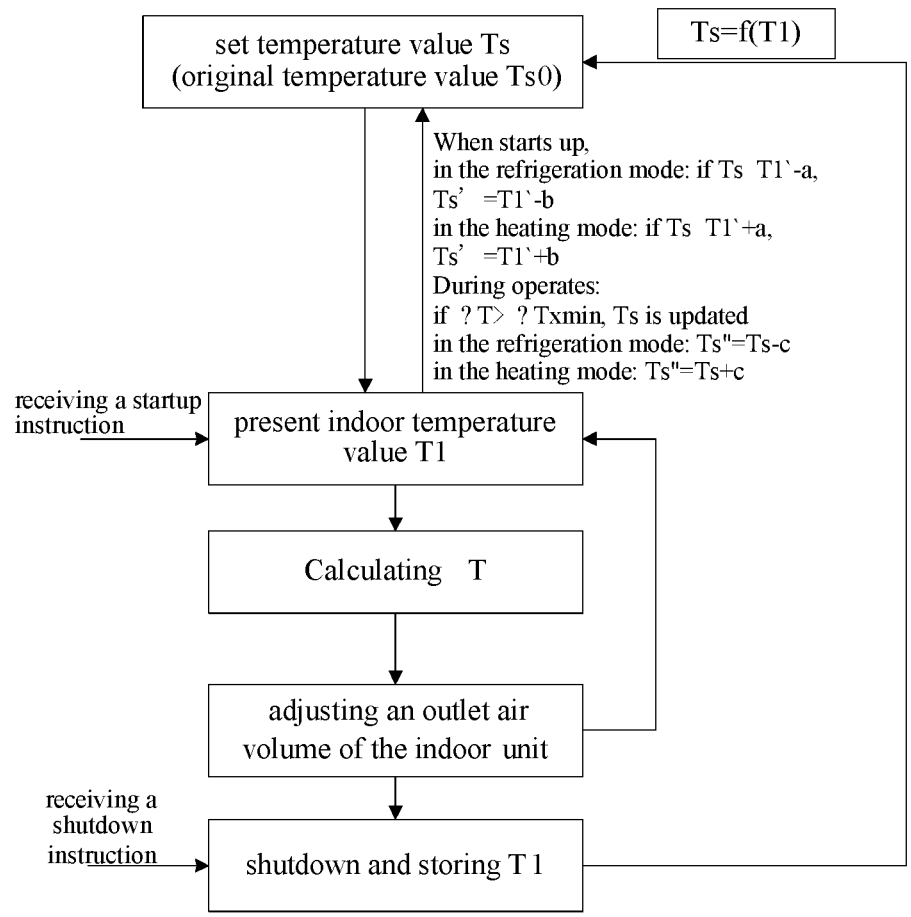
FIG. 2 illustrates a logic diagram of a duct-type air conditioning system according to a detailed embodiment of the present disclosure.

According to embodiments of the present disclosure, FIG. 2 illustrates a logic diagram of a duct-type air conditioning system according to a detailed embodiment of the present disclosure.

As illustrated in FIG. 2, when the indoor unit receives the startup instruction from the controller, if the indoor unit starts up first, the indoor unit generates the instruction for adjusting the wind speed according to the temperature difference ΔT between the original set temperature value Ts0 and the present indoor temperature value T1, and adjusts the outlet air volume of the indoor unit according to the instruction for adjusting the wind speed. During the indoor unit operates, it is determined at regular intervals whether the temperature difference ΔT between the present indoor temperature value T1 and the set temperature value Ts is greater than a temperature difference ΔTxmin before the system continuously operates for the preset x minutes, and if yes, the set temperature value Ts is corrected. If the indoor unit operates in the refrigeration mode, the corrected set temperature value Ts"=Ts−c; if the indoor unit operates in the heating mode, the corrected set temperature value Ts"=Ts+c. Then the instruction for adjusting the wind speed is generated according to the temperature difference ΔT between the corrected set temperature value Ts" and the present indoor temperature value T1, and the outlet air volume of the indoor unit is adjusted according to the instruction for adjusting the wind speed. When the indoor unit receives the shutdown instruction from the controller, the indoor unit shuts down and records the indoor temperature value T1 and the set temperature value Ts at the shutdown.

When the indoor unit receives the startup instruction sent by the controller again, if the indoor unit starts up in the refrigeration mode, the indoor unit obtains the present set temperature value Ts according to the indoor temperature value T1 and the set temperature value Ts recorded at the previous shutdown in the refrigeration mode, and compares the present set temperature value Ts with the indoor temperature value T1' detected at the startup of the indoor unit. If Ts≥T1'−a, the present set temperature value Ts'=T1'−b; if the indoor unit starts up in the heating mode, the indoor unit obtains the present set temperature value Ts according to the indoor temperature value T1 recorded at the previous shutdown in the heating mode, and compares the present set temperature value Ts and the indoor temperature value T1' detected when the indoor unit starts up. If Ts≤T1'+a, the present set temperature value Ts'=T1'+b. Then the instruction for adjusting the wind speed is generated according to the temperature difference ΔT between the present set temperature value Ts' and the present indoor temperature value T1, and the outlet air volume of the indoor unit is adjusted according to the instruction for adjusting the wind speed. During the indoor unit operates, the set temperature value Ts is corrected at regular intervals. When the indoor unit receives the shutdown instruction from the controller again, the indoor units shuts down and records the indoor temperature value and the set temperature value at the shutdown. Cycle is continued as described above.

It should be noted that, in the above embodiments, the indoor unit may employ a shift replacement mode to record the indoor temperature value T1 and the set temperature value Ts. For example, if the indoor unit may store 10 data, respectively corresponding to storage spaces A10、A11、A12、... A19. When the indoor unit receives the shutdown instruction for the first time, the indoor temperature value T11 at the first shutdown is stored in A10, and the remaining data is replaced by the indoor temperature value T11 when the shutdown instruction is received for the first time, that is, all the 10 data is T10; when the shutdown instruction is received for the second time, the indoor temperature value T12 at the second shutdown is stored in A11; when the shutdown instruction is received for the third time, the data in A11 is moved to A12, and then the indoor temperature value T13 at the third shutdown is stored in A11; when the shutdown instruction is received for the fourth time, the data in A12 is moved to A13 first, and then the data in A11 is moved to A12, and finally the indoor temperature value T14 at the fourth shutdown is stored in A11; ... and so on.

In conclusion, with the method for controlling the indoor fan of the duct-type air conditioning system provided in the embodiments of the present disclosure, when the system starts up, the present set temperature value is obtained according to the indoor temperature value and the set temperature value recorded at the previous shutdown of the system, then the temperature difference between the present indoor temperature value and the present set temperature value is calculated, and the instruction for adjusting the wind speed is generated according to the temperature difference, and finally the indoor fan is controlled according to the instruction for adjusting the wind speed, to adjust the outlet air volume of the indoor unit. Therefore, under a case that the indoor unit cannot receive the set temperature and the ambient temperature, the indoor unit may obtain the set temperature by the certain operation rule, thereby controlling the air volume automatically, improving the dehumidification performance of the air conditioner, and increasing the comfort performance and the energy conservation performance of the air conditioner.

In addition, the present disclosure further provides a non-temporary computer readable storage medium having stored one or more programs thereon. When the one or more programs are executed by a processor, the above method for controlling the indoor fan of the duct-type air conditioning system is implemented.

With the non-transitory computer readable storage medium provided in the embodiments of the present disclosure, the above method for controlling the indoor fan of the duct-type air conditioning system is executed. Therefore, under a case that the indoor unit cannot receive the set temperature and the ambient temperature, the indoor unit may obtain the set temperature by the certain operation rule, thereby controlling the air volume automatically, improving the dehumidification performance of the air conditioner, and increasing the comfort performance and the energy conservation performance of the air conditioner.

Figure 4:
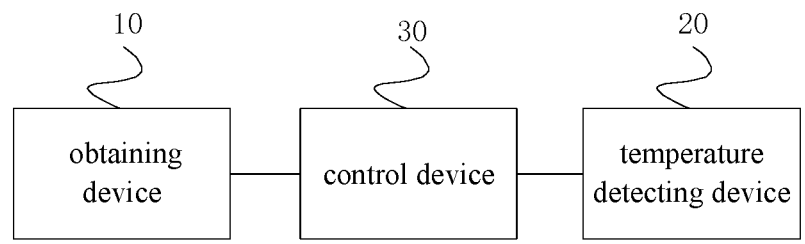
FIG. 4 illustrates a block diagram of a device for controlling an indoor fan of a duct-type air conditioning system according to an embodiment of the present disclosure.

FIG. 4 illustrates a block diagram of a device for controlling an indoor fan of a duct-type air conditioning system according to an embodiment of the present disclosure. As illustrated in FIG. 4, the device may include an obtaining device 10, a temperature detecting device 20 and a controlling device 30.

The obtaining device 10 is configured to, when the system starts up, obtain an indoor temperature value and a set temperature value recorded at a previous shutdown of the system, and obtain a present set temperature value according to the indoor temperature value and the set temperature value recorded at the previous shutdown of the system. The temperature detecting device 20 is configured to, detect a present indoor temperature value in real time. The control device 30 is configured to, calculate a temperature difference between the present indoor temperature value and the present set temperature value, generate an instruction for adjusting a wind speed according to the temperature difference, and control the indoor fan according to the instruction for adjusting the wind speed, to adjust an outlet air volume of the indoor unit.

According to an embodiment of the present disclosure, the obtaining device 10 is configured to, when the system starts up first, take a preset original set temperature value as the present set temperature value.

In detail, as illustrated in FIG. 3, the system 1000 may include an outdoor unit 100, an indoor unit 200 and a controller 300. The controller 300 controls the indoor unit to start up or shut down according to its set temperature value (which may be set by a user) and an indoor temperature value sensed by itself.

When the controller 300 controls the indoor unit 200 to start up first, the control device 30 may generate the instruction for adjusting the wind speed according to a temperature difference between the present indoor temperature value obtained by the temperature detecting device 20 and the preset original set temperature value, and adjust the outlet air volume of the indoor unit according to the instruction for adjusting the wind speed. When the indoor temperature value sensed by the controller 300 reaches the controller's set temperature value, the controller 300 sends a shutdown instruction to the indoor unit 200. The indoor unit shuts down and records the indoor temperature value and the set temperature value at the shutdown after receiving the shutdown instruction.

When the controller 300 determines that the indoor unit 200 needs to be controlled to start up again according to the controller's set temperature value and the indoor temperature value sensed by the controller, the controller 300 sends a startup command to the indoor unit 200. At this time, the obtaining device 10 obtains the present set temperature value according to the indoor temperature value and the set temperature value recorded at the previous shutdown. For example, the present set temperature value equals to the indoor temperature value recorded at the previous shutdown; or the present set temperature value=the indoor temperature value recorded at the previous shutdown *D1+the set temperature value recorded at the previous shutdown *D2, in which, D1 and D2 are scale factors. Then, the control device 30 generates the instruction for adjusting the wind speed according to the temperature difference between the present indoor temperature value detected in real time and the present set temperature value obtained, and adjusts the outlet air volume of the indoor unit according to the instruction for adjusting the wind speed. Therefore, under a case that the indoor unit cannot receive the set temperature and the ambient temperature, the indoor unit may obtain the set temperature by the certain operation rule, thereby controlling the air volume automatically, improving the dehumidification performance of the air conditioner, and increasing the comfort performance and the energy conservation performance of the air conditioner.

Figure 5:
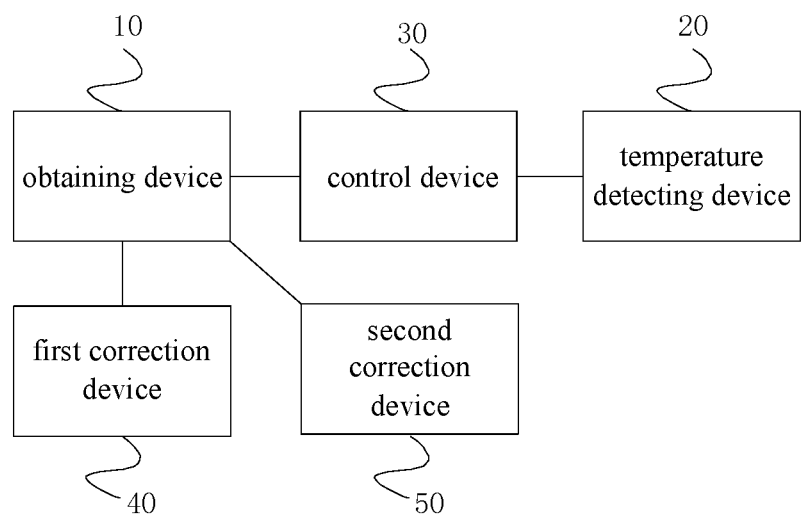
FIG. 5 illustrates a block diagram of a device for controlling an indoor fan of a duct-type air conditioning system according to another embodiment of the present disclosure.

According to an embodiment of the present disclosure, as illustrated in FIG. 5, the above device further includes a first correction device 40. The first correction device 40 is configured to correct the present set temperature value according to a relationship between the present indoor temperature value when the system starts up and the present set temperature value.

In detail, the set temperature value of the controller 300 may be adjusted. Therefore, if the controller 300 controls the indoor unit 200 to start up, when the control device 30, based on the present set temperature value obtained by the obtaining device 10, and the indoor temperature value detected by the temperature detecting device 20 at the startup, determines that the indoor unit 200 is not in accordance with the basic startup demand, the present set temperature value of the indoor unit 200 needs to be corrected.

For example, the set temperature value recorded at the previous shutdown of the indoor unit 200 is 27° C., and the indoor temperature value recorded at the previous shutdown of the indoor unit 200 is 25° C. Correspondingly, the present set temperature value obtained may be 26° C. (when D1=D2=50%), and the indoor temperature value detected by the temperature detecting device 20 through the temperature sensor at the return air duct is 26° C. when the controller 300 controls the indoor unit 200 to start up. In this case, the indoor unit 200 does not work according to a control logic of the indoor unit 200. Therefore, the present set temperature value of the indoor unit may be corrected (e.g. corrected to be 24° C.) according to a size relationship between the indoor temperature value when the indoor unit starts up and the present set temperature value, to ensure that the indoor unit may work normally.

Further, according to an embodiment of the present disclosure, the first correction device 40 is configured to correct the present set temperature value according to the relationship between the present indoor temperature value when the system starts up and the present set temperature value, in which, when the system operates in a refrigeration mode, the present set temperature value is set to be a difference between the present indoor temperature value when the system starts up and a second temperature threshold in response to the present set temperature value being greater than or equals to a difference between the present indoor temperature value when the system starts up and a first temperature threshold; and when the system operates in a heating mode, the present set temperature value is set to be a sum of the present indoor temperature value when the system starts up and the second temperature threshold in response to the present set temperature value being lower than or equals to a sum of the present indoor temperature value when the system starts up and the first temperature threshold. Both the first temperature threshold and the second temperature threshold may be a value among 0° C. to 5° C.

In detail, the controller 300 may control the indoor unit 200 to start up or shut down according to its set temperature value and the indoor temperature value sensed by itself, and simultaneously control the indoor unit 200 to start up in the heating mode or in the refrigeration mode according to an operation mode (provided by the user, or the operation mode is determined automatically).

When the controller 300 controls the indoor unit 200 to start up in the refrigeration mode according to the need, the obtaining device 10 firstly obtains the present set temperature value Ts according to the indoor temperature value T1 recorded at the previous shutdown in the refrigeration mode (or, T1 and the set temperature value recorded at the previous shutdown in the refrigeration mode), then the first correction device 40 corrects the present set temperature value Ts according to the present set temperature value Ts and the indoor temperature value T1' detected by the temperature detecting device 20 when the indoor unit starts up in the refrigeration mode again. If Ts≥T1'−a (a is the first temperature threshold), the present set temperature value is corrected to be Ts'=T1'−b (b is the second temperature threshold). Then the control device 30 generates the instruction for adjusting the wind speed according to a temperature difference between the present indoor temperature value obtained in real time and the present set temperature value Ts', and the outlet air volume of the indoor unit is adjusted according to the instruction for adjusting the wind speed.

When the controller 300 controls the indoor unit 200 to start up in the heating mode according to the need, the obtaining device 10 firstly obtains the present set temperature value Ts according to the indoor temperature value T1 recorded at the previous shutdown in the heating mode (or, T1 and the set temperature value recorded at the previous shutdown in the heating mode), then the first correction device 40 corrects the present set temperature value Ts according to the present set temperature value Ts and the indoor temperature value T1' detected by the temperature device 20 when the indoor unit starts up in the heating mode again. If Ts≥T1'+a, the present set temperature value is corrected to be Ts'=T1'+b. Then the controlling device 30 generates the instruction for adjusting the wind speed according to the temperature difference between the present indoor temperature value detected in real time and the present set temperature value Ts', and adjusts the outlet air volume of the indoor unit according to the instruction for adjusting the wind speed. In this way, by correcting the set temperature value, it is ensured that the indoor unit may operate normally after receiving the startup instruction from the controller.

According to an embodiment of the present disclosure, as illustrated in FIG. 5, the above device further includes a second correction device 50. The obtaining device 10 is further configured to, during the system operates, obtain the temperature difference in real time. The second correction device 50 is configured to correct the present set temperature value according to a present temperature difference and a temperature difference before the system continuously operates for a preset x minutes.

Further, according to an embodiment of the present disclosure, the second correction device 50 is configured to correct the present set temperature value according to the present temperature difference and the temperature difference before the system continuously operates for the preset x minutes, in which, the second correction device 50 is configured to, when the system operates in a refrigeration mode, correct the present set temperature value by reducing a third temperature threshold from the present set temperature value in response to the present temperature difference being greater than the temperature difference before the system continuously operates for the preset x minutes; and the second correction device 50 is configured to, when the system operates in a heating mode, correct the present set temperature value by adding the third temperature threshold to the present set temperature value in response to the present temperature difference being greater than the temperature difference before the system continuously operates for a preset x minutes. The third temperature threshold may be the value among 0° C. to 5° C.

In detail, during the system operates, updating may be performed on energy and needs according to the change of the indoor temperature value detected by the temperature detecting device 20, that is, continuously updating is performed on the set temperature value, and the outlet air volume is adjusted according to the updated set temperature value.

For example, during the indoor unit 200 operates in the refrigeration mode, the second correction device 50 corrects the set temperature value at regular intervals. When the set temperature value is corrected, the obtaining device 10 obtains a temperature difference between the set temperature value and the indoor temperature value, before the system continuously operates for the preset x minutes prior to the present time point. For example, if the present time point is t1, and a time point before the system continuously operates for the preset x minutes is t2, the temperature difference ΔTt1 between the set temperature value and the indoor temperature value at the present time point t1 is obtained, and the temperature difference ΔTt2 between the set temperature value and the indoor temperature value at the time point t2 is obtained. Then, it is determined whether ΔTt1 is greater than ΔTt2. If yes, the second correction device 50 updates the set temperature value Ts, and the updated set temperature value is Ts''=Ts−c (c is the third temperature threshold), and then outlet the air volume is adjusted according to the updated set temperature value Ts''; and if no, the present temperature value is not adjusted.

As another example, during the indoor unit 200 operates in the heating mode, the second correction device 50 corrects the set temperature value at regular intervals. When the set temperature value is corrected, the obtaining device 10 obtains a temperature difference between the set temperature value and the indoor temperature value, before the system continuously operates for the preset x minutes prior to the present time point. For example, if the present time point is t1, and a time point before the system continuously operates for the preset x minutes is t2, the temperature difference ΔTt1 between the set temperature value and the indoor temperature value at the present time point t1 is obtained, and the temperature difference ΔTt2 between the set temperature value and the indoor temperature value at the time point t2 is obtained. Then, it is determined whether ΔTt1 is greater than ΔTt2. If yes, the second correction device 50 updates the set temperature value Ts, and the updated set temperature is Ts"=Ts+c, and then the outlet air volume is adjusted according to the updated set temperature value Ts". In this way, the set temperature value is updated in real time according to the indoor temperature value, to obtain a preferable set temperature value, such that the system reaches to a preferable operation state, thus ensuring the comfort performance and the energy conservation performance of the system.

It should be noted that, the details not disclosed in the device for controlling the indoor fan of the duct-type air conditioning system in the embodiments of the present disclosure may refer to the details disclosed in the method for controlling the indoor fan of the duct-type air conditioning system in embodiments of the present disclosure, which is not elaborated herein.

Therefore, with the device for controlling the indoor fan of the duct-type air conditioning system provided in the embodiments of the present disclosure, when the system starts up, the obtaining device may obtain the indoor temperature value and the set temperature value recorded at the previous shutdown of the system, and obtain the present set temperature value according to the indoor temperature value and the set temperature value recorded at the previous shutdown of the system, then the control device may calculate the temperature difference between the present indoor temperature value and the present set temperature value, generate the instruction for adjusting the wind speed according to the temperature difference, and finally control the indoor fan according to the instruction for adjusting the wind speed, to adjust the outlet air volume of the indoor unit. Therefore, under a case that the indoor unit cannot receive the set temperature and the ambient temperature, the indoor unit may obtain the set temperature by the certain operation rule, thereby controlling the air volume automatically, improving the dehumidification performance of the air conditioner, and increasing the comfort performance and the energy conservation performance of the air conditioner.

In addition, embodiments of the present disclosure further provide a duct-type air conditioning system including the above device for controlling the indoor fan of the duct-type air conditioning system.

With the duct-type air conditioning system provided in the embodiments of the present disclosure, by the above device, under a case that the indoor unit cannot receive the set temperature and the ambient temperature, the indoor unit may obtain the set temperature by the certain operation rule, thereby controlling the air volume automatically, improving the dehumidification performance of the air conditioner, and increasing the comfort performance and the energy conservation performance of the air conditioner.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise", "axial", "radial" and "circumference" refer to the directions or location relations which are the directions or location relations shown in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

In addition, terms such as "first" and "second" are used herein for purposes of description. Furthermore, the feature defined with "first" and "second" may comprise one or more this feature distinctly or implicitly. In the description of the present disclosure, "a plurality of" means at least two, such as two, three, unless specified otherwise.

In the present disclosure, unless specified or limited otherwise, the terms "mounted," "connected," "coupled" and "fixed" are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components.

In the present disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases in various places throughout this specification are not necessarily referring to the same embodiment or example of the present disclosure. Furthermore, the particular features, structures, materials, or characteristics may be combined in any suitable manner in one or more embodiments or examples.

Any procedure or method described in the flow charts or described in any other way herein may be understood include one or more devices, portions or parts for executing instruction codes that implement steps of a custom logic function or procedure. And embodiments of the present disclosure includes other implementation, in which the order of execution is different from that which is depicted or discussed, including executing functions in a substantially simultaneous manner or in an opposite order according to the related functions.

The logic and/or step described in other manners herein or shown in the flow chart, for example, a particular sequence table of executable instructions for realizing the logical function, may be specifically achieved in any computer readable medium to be used by the instruction execution system, device or equipment (such as a system based on computers, a system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

What is claimed is:

1. A method for controlling an indoor fan of a duct-type air conditioning system, comprising:
    when the duct-type air conditioning system starts up, obtaining an indoor temperature value and a set temperature value recorded at a previous shutdown of the duct-type air conditioning system; and
    obtaining a present set temperature value according to the indoor temperature value and the set temperature value recorded at the previous shutdown of the duct-type air conditioning system;
    correcting the present set temperature value according to a relationship between the present indoor temperature value when the system starts up and the present set temperature value;
    detecting, in real time, a present indoor temperature value;
    calculating a temperature difference between the present indoor temperature value and the corrected present set temperature value;
    generating an instruction for adjusting a wind speed according to the temperature difference; and
    controlling the indoor fan according to the instruction for adjusting the wind speed, to adjust an outlet air volume of the indoor unit.

2. The method of claim 1, wherein, correcting the present set temperature value according to the relationship between the present indoor temperature value when the system starts up and the present set temperature value, comprises:
    when the system operates in a refrigeration mode, setting the present set temperature value to be a difference between the present indoor temperature value when the system starts up and a second temperature threshold in response to the present set temperature value being greater than or equals to a difference between the present indoor temperature value when the system starts up and a first temperature threshold; and
    when the system operates in a heating mode, setting the present set temperature value to be a sum of the present indoor temperature value when the system starts up and the second temperature threshold in response to the present set temperature value being lower than or equals to a sum of the present indoor temperature value when the system starts up and the first temperature threshold.

3. The method of claim 1, further comprising: during the system operates, obtaining the temperature difference in real time, and correcting the present set temperature value according to a present temperature difference and a temperature difference before the system continuously operates for a preset x minutes.

4. The method of claim 3, wherein, correcting the present set temperature value according to the present temperature difference and the temperature difference before the system continuously operates for the preset x minutes, comprises:
    when the system operates in a refrigeration mode, correcting the present set temperature value by reducing a third temperature threshold from the present set temperature value in response to the present temperature difference being greater than the temperature difference before the system continuously operates for the preset x minutes; and
    when the system operates in a heating mode, correcting the present set temperature value by adding the third temperature threshold to the present set temperature value in response to the present temperature difference being greater than the temperature difference before the system continuously operates for the preset x minutes.

5. The method of claim 1, wherein, when the system starts up first, a preset original set temperature value is taken as the present set temperature value.

6. A device for controlling an indoor fan of a duct-type air conditioning system, comprising:
    an obtaining device configured to when the duct-type air conditioning system starts up, obtain an indoor temperature value and a set temperature value recorded at a previous shutdown of the duct-type air conditioning system, and obtain a present set temperature value according to the indoor temperature value and the set temperature value recorded at the previous shutdown of the duct-type air conditioning system;
    a first correction module, configured to, correct the present set temperature value according to a relationship between the present indoor temperature value when the system starts up and the present set temperature value;
    a temperature detecting device configured to detect, in real time, a present indoor temperature value; and
    a control device configured to calculate a temperature difference between the present indoor temperature value and the corrected present set temperature value, generate an instruction for adjusting a wind speed according to the temperature difference, and control the indoor fan according to the instruction for adjusting the wind speed, to adjust an outlet air volume of the indoor unit.

7. The device of claim 6, wherein, the first correction module is configured to correct the present set temperature value according to the relationship between the present indoor temperature value when the system starts up and the present set temperature value, in which,
    when the system operates in a refrigeration mode, the present set temperature value is set to be a difference between the present indoor temperature value when the system starts up and a second temperature threshold in response to the present set temperature value being greater than or equals to a difference between the present indoor temperature value when the system starts up and a first temperature threshold; and when the system operates in a heating mode, the present set temperature value is set to be a sum of the present indoor temperature value when the system starts up and the second temperature threshold in response to the present set temperature value being lower than or equals to a sum of the present indoor temperature value when the system starts up and the first temperature threshold.

8. The device of claim 6, wherein, the obtaining module is further configured to, during the system operates, obtain the temperature difference in real time, and the device further comprises a second correction module, configured to, correct the present set temperature value according to a present temperature difference and a temperature difference before the system continuously operates for a preset x minutes.

9. The device of claim 8, wherein, the second correction module is configured to correct the present set temperature value according to the present temperature difference and the temperature difference before the system continuously operates for the preset x minutes, in which, when the system operates in a refrigeration mode, the second correction module is configured to correct the present set temperature value by reducing a third temperature threshold from the present set temperature value in response to the present temperature difference being greater than the present temperature difference before the system continuously operates for the preset x minutes; and when the system operates in a heating mode, the second correction module is configured to correct the present set temperature value by adding the third temperature threshold to the present set temperature value in response to the present temperature difference being greater than the temperature difference before the system continuously operates for the preset x minutes.

10. The device of claim 6, wherein, the obtaining module is configured to, when the system starts up first, take a preset original set temperature value as the present set temperature value.

11. A duct-type air conditioning system, comprising: the device for controlling the indoor fan of the duct-type air conditioning system of claim 6.

12. A non-temporary computer readable storage medium having computer programs stored thereon for controlling an indoor fan of a duct-type air conditioning system, wherein, when the computer programs are executed by a processor, cause the processor to:

when the duct-type air conditioning system starts up, obtaining an indoor temperature value and a set temperature value recorded at a previous shutdown of the duct-type air conditioning system; and obtain a present set temperature value according to the indoor temperature value and the set temperature value recorded at the previous shutdown of the duct-type air conditioning system;

correct the present set temperature value according to a relationship between the present indoor temperature value when the system starts up and the present set temperature value;

detect in real time, a present indoor temperature value in real time;

calculate a temperature difference between the present indoor temperature value and the corrected present set temperature value;

generate an instruction for adjusting a wind speed according to the temperature difference; and control the indoor fan according to the instruction for adjusting the wind speed, to adjust an outlet air volume of the indoor unit.

* * * * *